US010194273B2

(12) United States Patent
 Xie (10) Patent No.: US 10,194,273 B2
(45) Date of Patent: Jan. 29, 2019

(54) POSITIONING INFORMATION PROCESSING METHOD AND APPARATUS

(71) Applicant: Huawei Technologies Co., Ltd., Shenzhen (CN)

(72) Inventor: Qi Xie, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/771,791

(22) PCT Filed: Oct. 25, 2016

(86) PCT No.: PCT/CN2016/103262
§ 371 (c)(1),
(2) Date: Apr. 27, 2018

(87) PCT Pub. No.: WO2017/071562
PCT Pub. Date: May 4, 2017

(65) Prior Publication Data
US 2018/0310129 A1   Oct. 25, 2018

(30) Foreign Application Priority Data
Oct. 27, 2015   (CN) .......................... 2015 1 0713090

(51) Int. Cl.
*H04W 4/02* (2018.01)
*G01C 21/36* (2006.01)
(Continued)

(52) U.S. Cl.
CPC ............. *H04W 4/023* (2013.01); *H04L 67/18* (2013.01); *H04W 4/024* (2018.02); *H04W 4/026* (2013.01); *H04W 64/00* (2013.01); *G01C 21/367* (2013.01)

(58) Field of Classification Search
CPC ..... H04W 4/023; H04W 4/024; H04W 4/026; H04W 64/00; H04L 67/18; G01C 21/367
See application file for complete search history.

(56) References Cited

U.S. PATENT DOCUMENTS 7,645,272 B2 * 1/2010 Chang ................ A61B 17/1204
                                                                  604/509
2004/0203897 A1   10/2004 Rogers
(Continued)

FOREIGN PATENT DOCUMENTS

| CN | 101482604 A | 7/2009 |
| CN | 101979962 A | 2/2011 |
| CN | 104333564 A | 2/2015 |

OTHER PUBLICATIONS

Gonçalves, T., et al.,"Evaluation of HaloDot: Visualization of Relevance of Off-Screen Objects with over Cluttering Prevention on Mobile Devices," XP047324642, Sep. 5, 2011, 10 pages.
(Continued)

*Primary Examiner* — Brandon J Miller
(74) *Attorney, Agent, or Firm* — Conley Rose, P.C.

(57) ABSTRACT

A positioning information processing method and apparatus, where the method includes obtaining, by a terminal device, location information of at least two to-be-positioned targets, selecting, by the terminal device, a first to-be-positioned target from the at least two to-be-positioned targets according to the location information of all the to-be-positioned targets, displaying, by the terminal device, location information of the first to-be-positioned target, and indicating an orientation and a quantity of other to-be-positioned targets, different from the first to-be-positioned target, in the at least two to-be-positioned targets according to the location information of all the to-be-positioned targets.

14 Claims, 8 Drawing Sheets

(51) Int. Cl.
*H04L 29/08* (2006.01)
*H04W 4/024* (2018.01)
*H04W 64/00* (2009.01)

(56) References Cited

U.S. PATENT DOCUMENTS

| | | | |
|---|---|---|---|
| 2007/0288161 A1* | 12/2007 | Neef | G01C 21/26 701/532 |
| 2008/0070593 A1 | 3/2008 | Altman et al. | |
| 2009/0233629 A1* | 9/2009 | Jayanthi | H04L 12/5865 455/457 |
| 2012/0008526 A1 | 1/2012 | Borghei | |
| 2015/0373490 A1* | 12/2015 | Kitchen | H04W 4/023 455/456.1 |
| 2016/0110907 A1* | 4/2016 | Kelly | A63F 13/25 345/473 |

OTHER PUBLICATIONS

Siu, T., et al.,"SidebARs:Improving awareness of off-screen elements in mobile augmented reality," XP058035272, Nov. 11, 2013, 6 pages.

Gonçalves, T., et al.,"Comparison of off-screen Visualizatian Techniques with Representation of Relevance on Mobile Devices," XP058035705, Sep. 9, 2013, 10 pages.

Foreign Communication From a Counterpart Application, European Application No. 16858997.6, Extended European Search Report dated Jun. 21, 2018, 15 pages.

Machine Translation and Abstract of Chinese Publication No. CN101482604, Jul. 15, 2009, 11 pages.

Machine Translation and Abstract of Chinese Publication No. CN101979962, Feb. 23, 2011, 13 pages.

Machine Translation and Abstract of Chinese Publication No. CN104333564, Feb. 4, 2015, 27 pages.

Foreign Communication From a Counterpart Application, PCT Application No. PCT/CN2016/103262, English Translation of International Search Report dated Jan. 23, 2017, 2 pages.

Foreign Communication From a Counterpart Application, PCT Application No. PCT/CN2016/103262, English Translation of Written Opinion dated Jan. 23, 2017, 5 pages.

* cited by examiner

POSITIONING INFORMATION PROCESSING METHOD AND APPARATUS

CROSS-REFERENCE TO RELATED APPLICATIONS

This application is a U.S. National Stage of International Patent Application No. PCT/CN2016/103262 filed on Oct. 25, 2016, which claims priority to Chinese Patent Application No. 201510713090.3 filed on Oct. 27, 2015. Both of the aforementioned applications are hereby incorporated by reference in their entireties.

TECHNICAL FIELD

Embodiments of the present disclosure relate to positioning technologies, and in particular, to a positioning information processing method and apparatus.

BACKGROUND

With popularization of various positioning systems, such as a Global Positioning System (GPS) and the BeiDou Navigation Satellite System (BDS), users can use these systems to implement all-day, continuous, and real-time positioning of such targets as other electronic devices, parking lots, supermarkets, and shopping malls in life, to obtain required location information.

At present, an existing manner of positioning various targets further includes obtaining, using the GPS, the BDS, or the like and according to target information input by a user in an application or a terminal device having a map-based positioning function, all location points corresponding to the target information. There may be a plurality of location points that are relatively far away from each other. To display all the location points to the user, a map is scaled down, and all the location points corresponding to the target information are displayed on a map of a same view interface.

However, to display a plurality of location points in a same view when location points are relatively far away from each other, a rough location of each location point is displayed only by scaling down the map, leading to a decrease in accuracy of a displayed location of a target location point.

SUMMARY

Embodiments of the present disclosure provide a positioning information processing method and apparatus to resolve the following problem. To display a plurality of location points in a same view when location points are relatively far away from each other, a rough location of each location point is displayed only by scaling down the map, leading to a decrease in accuracy of a displayed location of a target location point.

A first aspect of the present disclosure provides a positioning information processing method, including obtaining, by a terminal device, location information of at least two to-be-positioned targets, selecting, by the terminal device, a first to-be-positioned target from the at least two to-be-positioned targets according to the location information of all the to-be-positioned targets, and displaying, by the terminal device, location information of the first to-be-positioned target, and indicating an orientation and a quantity of other to-be-positioned targets, different from the first to-be-positioned target, in the at least two to-be-positioned targets according to the location information of all the to-be-positioned targets.

In the foregoing solution, the terminal device performs centralized analysis and processing on the obtained location information of all the to-be-positioned targets, determines a primary first to-be-positioned target, and displays a location of the first to-be-positioned target on a map that is not scaled down in order to improve accuracy of displaying the location information of the first to-be-positioned target.

In a first possible implementation of the first aspect, selecting, by the terminal device, a first to-be-positioned target from the at least two to-be-positioned targets according to the location information of all the to-be-positioned targets includes obtaining, by the terminal device according to the location information of all the to-be-positioned targets, at least one to-be-positioned target whose distance from the terminal device is less than a preset first distance threshold, as the first to-be-positioned target.

This solution provides a specific implementation of determining the first to-be-positioned target from a plurality of to-be-positioned targets, that is, selecting a to-be-positioned target that is relatively close to the terminal device as the first to-be-positioned target for displaying. An advantage of this implementation lies in that information that is more valuable is selected with no need to scale down a current view of the terminal device to display all the to-be-positioned targets, and not only accuracy of displaying the location information of the first to-be-positioned target is improved, but also displaying an excessively large amount of redundant information to a user is avoided, thereby reducing selection time of the user.

With reference to the first aspect or the first implementation of the first aspect, in a second implementation of the first aspect, before obtaining, by a terminal device, location information of at least two to-be-positioned targets, the method further includes sending, by the terminal device, a positioning request to a positioning server, where the positioning request includes identifier information of each to-be-positioned target and the positioning request is used to instruct the positioning server to position each to-be-positioned target and obtain positioning information.

In this manner, obtaining, by a terminal device, location information of at least one to-be-positioned target includes receiving, by the terminal device, the location information of all the to-be-positioned targets that is sent by the positioning server.

This solution provides a specific manner of obtaining location information of a to-be-positioned target. A request is sent to the positioning server to position a to-be-positioned target, and location information returned by the positioning server is received. Actually, in a specific implementation, in addition to positioning performed using the GPS, the BDS, and another positioning server, base station positioning, wireless local area network (WLAN) positioning, hotspot positioning, Network Protocol Internet Protocol (IP) positioning, and the like may be used for positioning a to-be-positioned target to obtain location information of the to-be-positioned target. This is not limited in the present disclosure.

With reference to the first aspect or any one implementation of the first aspect, in a third implementation of the first aspect, before selecting, by the terminal device, a first to-be-positioned target from the at least two to-be-positioned targets according to the location information of all the to-be-positioned targets, the method further includes obtaining, by the terminal device, a particular target identifier, where the particular target identifier is used to indicate a to-be-positioned target whose location information needs to be obtained by a user.

With reference to the third implementation of the first aspect, in a fourth implementation of the first aspect, selecting, by the terminal device, a first to-be-positioned target from the at least two to-be-positioned targets according to the location information of all the to-be-positioned targets includes setting, by the terminal device according to the location information of all the to-be-positioned targets, the to-be-positioned target corresponding to the particular target identifier and a to-be-positioned target that is in the at least two to-be-positioned targets and whose distance from the to-be-positioned target corresponding to the particular target identifier is less than a preset second distance threshold, as the first to-be-positioned target.

The third and fourth implementations of the first aspect provide another manner of obtaining the first to-be-positioned target from a plurality of to-be-positioned targets. The manner includes obtaining an identifier of a particular target selected by a user, where the identifier is usually directly input by the user, selecting a to-be-positioned target whose distance from the to-be-positioned target corresponding to the particular target identifier is within a specific range and setting the to-be-positioned target and the particular target as the first to-be-positioned target after location information of the plurality of to-be-positioned targets is obtained, and displaying the first to-be-positioned target on a current interface of the terminal device. According to this solution, accuracy of displaying location information of the particular target is improved, and also relatively accurate location information of another related target that is relatively close to the particular target is provided for the user, thereby reducing selection time for the user.

With reference to the first aspect or any one implementation of the first aspect, in a fifth implementation of the first aspect, displaying, by the terminal device, location information of the first to-be-positioned target, and indicating an orientation and a quantity of other to-be-positioned targets, different from the first to-be-positioned target, in the at least two to-be-positioned targets according to the location information of all the to-be-positioned targets includes displaying, by the terminal device according to the location information of all the to-be-positioned targets and in a first area on a preset-scale map displayed on a screen of the terminal device, the location information of the first to-be-positioned target and location information of other to-be-positioned targets located in the first area, and indicating, by the terminal device using a pointer, an orientation of other to-be-positioned targets located outside the first area, and displaying a quantity of the other to-be-positioned targets located outside the first area, where the first area is a displayable area range of the preset-scale map on the screen of the terminal device.

In this solution, after the first to-be-positioned target is obtained by performing analysis and processing on the obtained location information of the to-be-positioned targets, in a specific display process, the first to-be-positioned target is displayed on the screen of the terminal device using the preset-scale map and a rough orientation and a quantity of remaining to-be-positioned targets are indicated. In this case, the direction of the remaining to-be-positioned targets is provided while improving accuracy of displaying the location information of the first to-be-positioned target. This is convenient for a user to effectively search for other to-be-positioned targets, reducing time for searching for the other to-be-positioned targets.

In any one of the foregoing solutions, in the present disclosure, no limitation is set to displaying the quantity of remaining to-be-positioned targets, and displaying only the orientation of the remaining to-be-positioned targets is acceptable. In addition, if there is no other to-be-positioned target within a second threshold range of the to-be-positioned target, the map may also be scaled up to display the particular target in order to further improve accuracy of displaying location information. This is not limited in the present disclosure.

A second aspect of the present disclosure provides a positioning information processing apparatus, including an obtaining module configured to obtain location information of at least two to-be-positioned targets, a processing module configured to select a first to-be-positioned target from the at least two to-be-positioned targets according to the location information of all the to-be-positioned targets, and a display module configured to display location information of the first to-be-positioned target, and indicate an orientation and a quantity of other to-be-positioned targets, different from the first to-be-positioned target, in the at least two to-be-positioned targets according to the location information of all the to-be-positioned targets.

With reference to the second aspect, in a first possible implementation of the second aspect, the processing module is further configured to obtain, according to the location information of all the to-be-positioned targets, at least one to-be-positioned target whose distance from the positioning information processing apparatus is less than a preset first distance threshold, as the first to-be-positioned target.

With reference to the second aspect or the first possible implementation of the second aspect, in a second possible implementation of the second aspect, the apparatus further includes a sending module configured to send a positioning request to a positioning server, where the positioning request includes identifier information of each to-be-positioned target and the positioning request is used to instruct the positioning server to position each to-be-positioned target and obtain positioning information.

With reference to the second aspect or the first possible implementation of the second aspect, in a third possible implementation of the second aspect, the obtaining module is further configured to obtain a particular target identifier, where the particular target identifier is used to indicate a to-be-positioned target whose location information needs to be obtained by a user.

With reference to the third possible implementation of the second aspect, in a fourth possible implementation of the second aspect, the processing module is further configured to set, according to the location information of all the to-be-positioned targets, the to-be-positioned target corresponding to the particular target identifier and a to-be-positioned target that is in the at least two to-be-positioned targets and whose distance from the to-be-positioned target corresponding to the particular target identifier is less than a preset second distance threshold, as the first to-be-positioned target.

With reference to the second aspect and any one possible implementation of the second aspect, in a fifth possible implementation of the second aspect, the obtaining module includes a receiving unit configured to receive the location information of all the to-be-positioned targets that is sent by the positioning server.

With reference to the second aspect and any one possible implementation of the second aspect, in a sixth possible implementation of the second aspect, the display module is further configured to display, according to the location information of all the to-be-positioned targets and in a first area on a preset-scale map displayed on a screen of the terminal device, the location information of the first to-be-positioned target and location information of other to-be-positioned targets located in the first area, and indicate, using a pointer, an orientation of other to-be-positioned targets located outside the first area and display a quantity of the other to-be-positioned targets located outside the first area, where the first area is a displayable area range of the preset-scale map on the screen of the terminal device.

A third aspect of the present disclosure provides a terminal device, including a processor configured to control the terminal device to obtain location information of at least two to-be-positioned targets, where the processor is configured to select a first to-be-positioned target from the at least two to-be-positioned targets according to the location information of all the to-be-positioned targets, and a display configured to display location information of the first to-be-positioned target, and indicate an orientation and a quantity of other to-be-positioned targets, different from the first to-be-positioned target, in the at least two to-be-positioned targets according to the location information of all the to-be-positioned targets.

With reference to the third aspect, in a first possible implementation of the third aspect, the processor is further configured to obtain, according to the location information of all the to-be-positioned targets, at least one to-be-positioned target whose distance from the terminal device is less than a preset first distance threshold, as the first to-be-positioned target.

With reference to the third aspect or the first possible implementation of the third aspect, in a second possible implementation of the third aspect, the terminal device further includes a transmitter configured to send a positioning request to a positioning server, where the positioning request includes identifier information of each to-be-positioned target and the positioning request is used to instruct the positioning server to position each to-be-positioned target and obtain positioning information.

With reference to the third aspect or the first possible implementation of the third aspect, in a third possible implementation of the third aspect, the processor is further configured to control the terminal device to obtain a particular target identifier, where the particular target identifier is used to indicate a to-be-positioned target whose location information needs to be obtained by a user.

With reference to the third possible implementation of the third aspect, in a fourth possible implementation of the third aspect, the processor is further configured to set, according to the location information of all the to-be-positioned targets, the to-be-positioned target corresponding to the particular target identifier and a to-be-positioned target that is in the at least two to-be-positioned targets and whose distance from the to-be-positioned target corresponding to the particular target identifier is less than a preset second distance threshold, as the first to-be-positioned target.

With reference to the third aspect or any one possible implementation of the third aspect, in a fifth possible implementation of the third aspect, the terminal device includes a receiver configured to receive the location information of all the to-be-positioned targets that is sent by the positioning server.

With reference to the third aspect or any one possible implementation of the third aspect, in a sixth possible implementation of the third aspect, the display is further configured to display, according to the location information of all the to-be-positioned targets and in a first area on a preset-scale map displayed on a screen of the terminal device, the location information of the first to-be-positioned target and location information of other to-be-positioned targets located in the first area, and indicate, using a pointer, an orientation of other to-be-positioned targets located outside the first area, and display a quantity of the other to-be-positioned targets located outside the first area, where the first area is a displayable area range of the preset-scale map on the screen of the terminal device.

According to the positioning information processing method and apparatus that are provided in the present disclosure, centralized analysis and processing are performed on the obtained location information of all the to-be-positioned targets to determine a primary first to-be-positioned target from the to-be-positioned targets, and location information of the first to-be-positioned target is displayed on the screen of the terminal device using the preset-scale map, and a rough direction of other to-be-positioned targets is indicated with no need to scale down the current map to display all the to-be-positioned targets. Compared with a prior-art solution in which a map is scaled down to display a plurality of location points in a same view and a decrease in accuracy is caused, in the present disclosure, a location of the first to-be-positioned target is displayed on a map that is not scaled down in order to improve accuracy of displaying the location information of the first to-be-positioned target.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
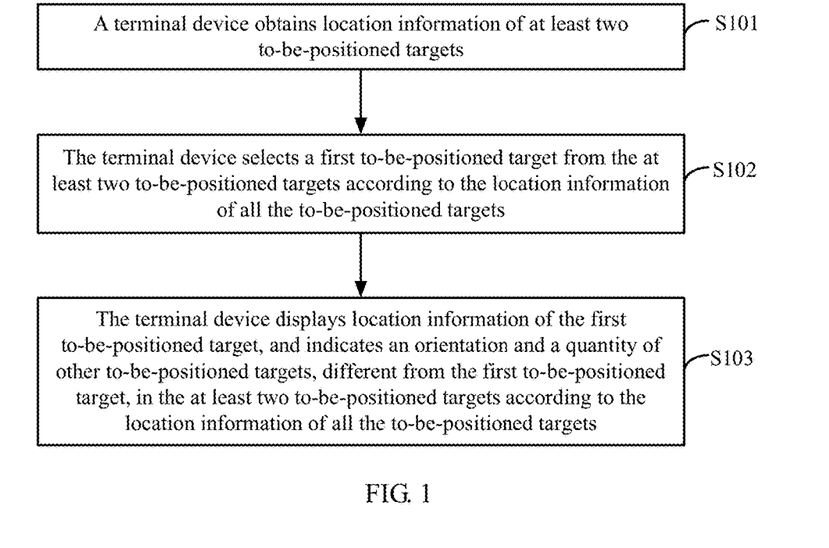
FIG. 1 is a flowchart of Embodiment 1 of a positioning information processing method according to an embodiment of the present disclosure.

FIG. 1 is a flowchart of Embodiment 1 of a positioning information processing method according to an embodiment of the present disclosure. As shown in FIG. 1, an entity for executing this embodiment may be an independent device used only for positioning and map display, or may be a terminal device having usable map software, such as a computer, a smartphone, a tablet computer, a personal digital assistant, a multimedia player, or a navigator apparatus. Specific implementation steps of the positioning information processing method are as follows.

Step S101: A terminal device obtains location information of at least two to-be-positioned targets.

In this embodiment, the terminal device needs to obtain specific location information of a plurality of to-be-positioned targets. An obtaining manner may be positioning on the to-be-positioned target by means of GPS positioning, BDS positioning, base station positioning, or hybrid positioning based on both WI-FI positioning, or hybrid positioning based on a WI-FI signal and a base station signal in order to obtain the specific location information of all the to-be-positioned targets.

The foregoing to-be-positioned target may be an electronic device, for example, a smart band, a smart watch, a mobile phone, a computer, or a smart home device, or may be a shopping mall, a parking lot, or a store having a logo. This is not limited in this application.

Step S102: The terminal device selects a first to-be-positioned target from the at least two to-be-positioned targets according to the location information of all the to-be-positioned targets.

In this embodiment, after obtaining the location information of the to-be-positioned targets, the terminal device determines the first to-be-positioned target according to the relative locations between all the to-be-positioned targets or locations of each to-be-positioned target and the terminal device. There may be one or more first to-be-positioned targets.

Step S103: The terminal device displays location information of the first to-be-positioned target, and indicates an orientation and a quantity of other to-be-positioned targets, different from the first to-be-positioned target, in the at least two to-be-positioned targets according to the location information of all the to-be-positioned targets.

In this embodiment, the terminal device presents the obtained location information of the first to-be-positioned target using a map or another application program that can be used for location display, that is, displays the obtained location information of the first to-be-positioned target on a screen of the terminal device. A geographical location of the first to-be-positioned target can be accurately determined using the location information of the first to-be-positioned target. Therefore, the location information includes at least one of an address (for example, No. xx, road xx), geographic coordinates, latitude and longitude information, and a direction. In addition, the orientation and the quantity of the other to-be-positioned targets, different from the first to-be-positioned target, in the to-be-positioned targets, are indicated. That is, if these other to-be-positioned targets cannot be displayed within a map range displayed on the screen of the terminal device, scaling down is not required and the orientation of all the other to-be-positioned targets is indicated in a current interface. For example, a rough direction is indicated using a pointer or a direction line.

According to the positioning information processing method provided in this embodiment, centralized analysis and processing are performed on the obtained location information of all the to-be-positioned targets to determine a primary first to-be-positioned target from the to-be-positioned targets, and detailed location information of the first to-be-positioned target is displayed on the screen of the terminal device, and a rough orientation and a quantity of other to-be-positioned targets are indicated. A location of the first to-be-positioned target is displayed on a map that is not scaled down in order to improve accuracy of displaying the location information of the first to-be-positioned target.

Figure 2:
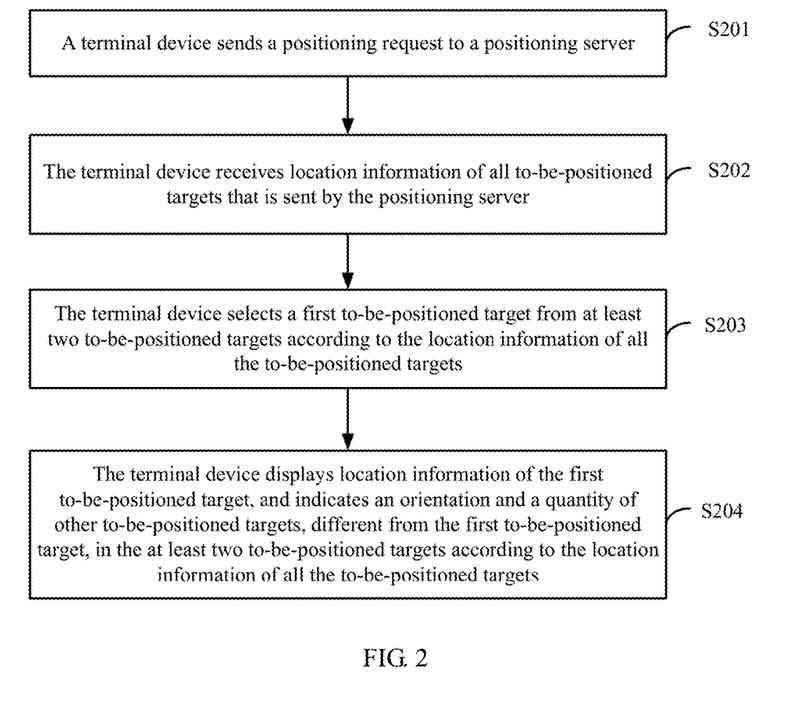
FIG. 2 is a flowchart of Embodiment 2 of a positioning information processing method according to an embodiment of the present disclosure.

FIG. 2 is a flowchart of Embodiment 2 of a positioning information processing method according to an embodiment of the present disclosure. As shown in FIG. 2, on the basis of the foregoing Embodiment 1, the present disclosure further provides a specific implementation, including the following steps.

Step S201: The terminal device sends a positioning request to a positioning server.

In this embodiment, the positioning request includes identifier information of each to-be-positioned target, and the positioning request is used to instruct the positioning server to position each to-be-positioned target and obtain positioning information. The positioning server may be a server of the GPS, the BDS, or another positioning system, or may be a network device that uses WI-FI to obtain positioning information. This is not limited in this application.

Optionally, the positioning request includes identifier information of the first to-be-positioned target. That is, the positioning request includes the identifier information of all the to-be-positioned targets, for example, an electronic device, and may further include a detailed identifier of a first device that needs to be particularly positioned such that the terminal device can directly obtain location information of the first to-be-positioned target. This reduces subsequent processing time and resources.

Step S202: The terminal device receives the location information of all the to-be-positioned targets that is sent by the positioning server.

Step S203: The terminal device selects the first to-be-positioned target from the at least two to-be-positioned targets according to the location information of all the to-be-positioned targets.

In this embodiment, a specific implementation of selecting the first to-be-positioned target by the terminal device includes at least the following two types.

In a first possible implementation, the terminal device obtains, according to the location information of all the to-be-positioned targets, at least one to-be-positioned target whose distance from the terminal device is less than a preset first distance threshold, as the first to-be-positioned target.

In this manner, after obtaining the location information of all the to-be-positioned targets, the terminal device uses, according to the location information and a location of the terminal device, at least one to-be-positioned target that is in a plurality of to-be-positioned targets and that is relatively close to the terminal device, as the first to-be-positioned target. The first distance threshold may be configured in advance. To ensure display accuracy, the first distance threshold may be determined according to a display status, corresponding to a map scale, in a screen of the terminal device, and the like.

In a second possible implementation, the terminal device obtains a particular target identifier, and the particular target identifier is used to indicate a to-be-positioned target whose location information needs to be obtained by a user. In a commonly used manner, the user directly inputs the particular target identifier using the terminal device. Then, the terminal device obtains, from the at least two to-be-positioned targets according to the location information of all the to-be-positioned targets, a to-be-positioned target whose relative distance from a to-be-positioned target corresponding to the particular target identifier is less than a preset second distance threshold, and uses the selected to-be-positioned target and the to-be-positioned target corresponding to the particular target identifier, as the first to-be-positioned target.

In an embodiment, the terminal device uses, according to the location information of all the to-be-positioned targets, the to-be-positioned target corresponding to the particular target identifier and the to-be-positioned target that is in the at least two to-be-positioned targets and whose distance from the to-be-positioned target corresponding to the particular target identifier is less than the preset second distance threshold, as the first to-be-positioned target.

In this manner, the terminal device uses a particular target and a to-be-positioned target that is in other to-be-positioned targets and that is relatively close to the particular target, as the first to-be-positioned target.

Step S204: The terminal device displays location information of the first to-be-positioned target, and indicates an orientation and a quantity of other to-be-positioned targets, different from the first to-be-positioned target, in the at least two to-be-positioned targets according to the location information of all the to-be-positioned targets.

In this embodiment, there are at least two specific implementations of displaying location information of a to-be-positioned target and indicating a direction of the to-be-positioned target.

In a first manner, the terminal device displays, according to the location information of all the to-be-positioned targets and in a first area on a preset-scale map on the screen of the terminal device, the location information of the first to-be-positioned target and location information of other to-be-positioned targets located in the first area, and indicates, using a pointer, an orientation of other to-be-positioned targets located outside the first area. The first area is a displayable area range of the preset-scale map on the screen of the terminal device.

In a second manner, the terminal device displays, according to the location information of all the to-be-positioned targets and in a first area on a preset-scale map displayed on the screen of the terminal device, the location information of the first to-be-positioned target and location information of other to-be-positioned targets located in the first area.

The terminal device indicates, using a pointer, an orientation of other to-be-positioned targets located outside the first area, and displays a quantity of the other to-be-positioned targets located outside the first area. The first area is a displayable area range of the preset-scale map on the screen of the terminal device.

According to the positioning information processing method provided in this embodiment, several commonly-used specific implementations of determining the first to-be-positioned target from a plurality of to-be-positioned targets, that is, selecting a to-be-positioned target that is relatively close to the terminal device as the first to-be-positioned target for displaying are provided. An advantage of this implementation lies in that information that is more valuable is selected with no need to scale down a current view of the terminal device to display all the to-be-positioned targets, and not only accuracy of displaying the location information of the first to-be-positioned target is improved, but also displaying an excessively large amount of redundant information to a user is avoided, thereby reducing selection time of the user.

With reference to the foregoing two embodiments, the following describes in detail, using several specific examples, the positioning information processing method provided in the present disclosure.

A main purpose of this solution includes when location information of a plurality of to-be-positioned targets that are far away needs to be displayed, detailed location information of one first to-be-positioned target that is selected or detailed location information of a plurality of first to-be-positioned targets that are relatively close to each other is displayed in a same view (a map background with a relatively large scale), and a rough direction of another to-be-positioned target that is relatively far away is also indicated.

The terminal device may be a mobile phone, a tablet computer, or the like of a guardian. For example, an electronic device worn by a child is a to-be-positioned target and the terminal device is a mobile phone. Optionally, a current positioning function or a map application of the terminal device may be set to a child mode. In the child mode, a plurality of electronic devices is to be positioned. For example, three electronic devices are to be positioned herein. The mobile phone sends a positioning request to a positioning server, and receives returned location information of each electronic device. When two electronic devices are relatively close to each other (for example, the two electronic devices can be simultaneously displayed within a range of a 200-meter scale map on a screen of the mobile phone) and the two electronic devices are relatively far away from a third electronic device, specific location information of the two electronic devices that are relatively close to each other and a relative orientation of the third electronic device are to be presented in a same view on the screen of the mobile phone.

Figure 3A:
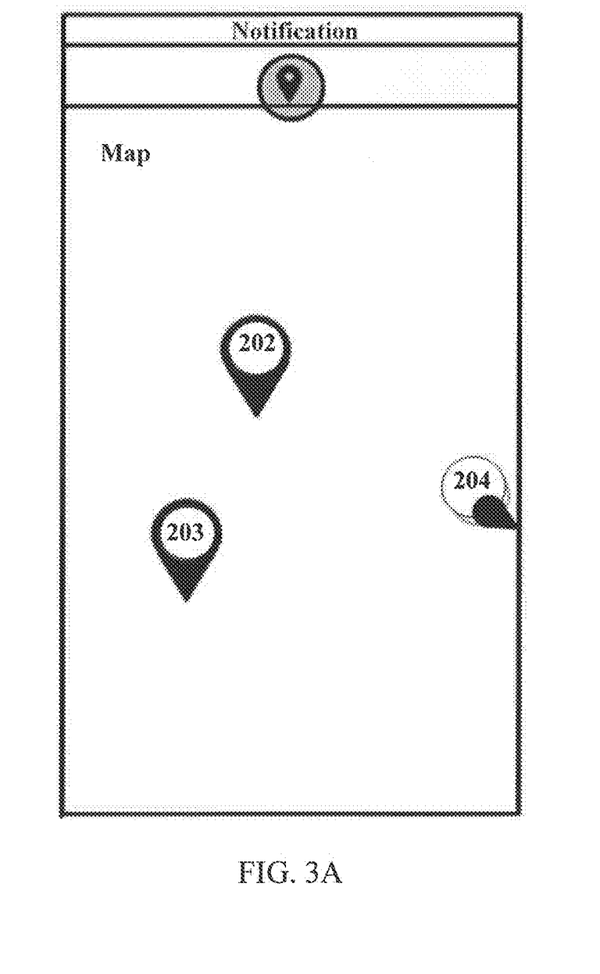
FIG. 3A is a schematic display diagram of an instance of a positioning information processing method according to the present disclosure.
Figure 3B:
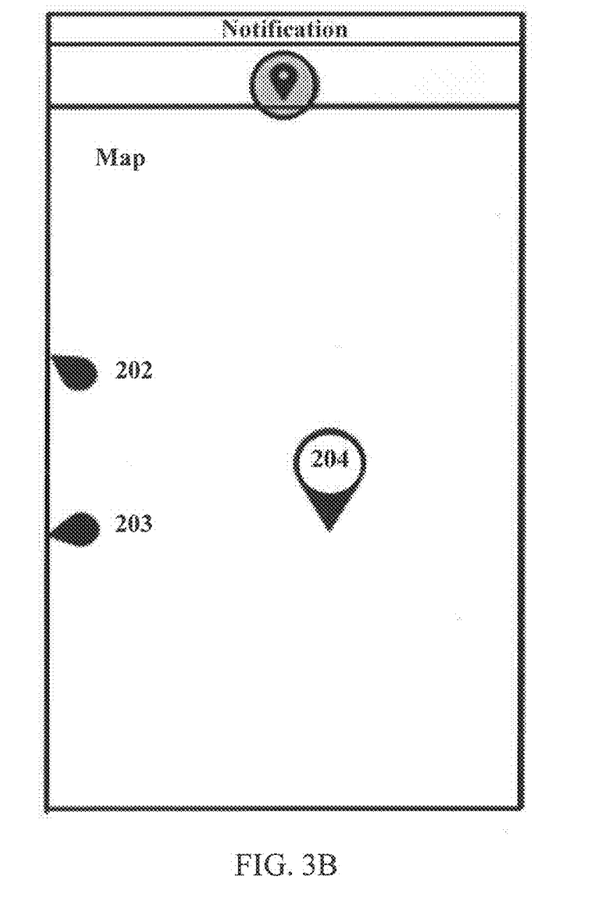
FIG. 3B is a schematic display diagram of another instance of a positioning information processing method according to the present disclosure.

FIG. 3A is a schematic display diagram of an instance of a positioning information processing method according to the present disclosure. FIG. 3B is a schematic display diagram of another instance of the positioning information processing method according to the present disclosure. As shown in FIG. 3A and FIG. 3B, a mobile phone 201 initiates a positioning request for obtaining positioning information of a plurality of electronic devices. After receiving the request, positioning servers of three electronic devices 202, 203, and 204 obtain, using (one or more of) the GPS, the BDS, or WI-FI, a specific value of positioning information, that is, location information, and return the specific value of the positioning information to a map application on the mobile phone. A status corresponding to the (type of) value has been defined in a database of the map application. By means of data processing, the mobile phone learns that the electronic devices 202 and 203 are relatively close to each other (or a relative distance is less than a threshold), and then displays specific location information of the electronic devices 202 and 203 in a same view on the mobile phone. In addition, an orientation of the electronic device 204 is indicated using a pointer and a directional view. When a user needs to view location information of the electronic device 204, the user may perform an operation such as dragging to display the location information of the electronic device 204 in the center of a screen. In this case, directions of the electronic devices 202 and 203 may be indicated in a view.

Figure 4A:
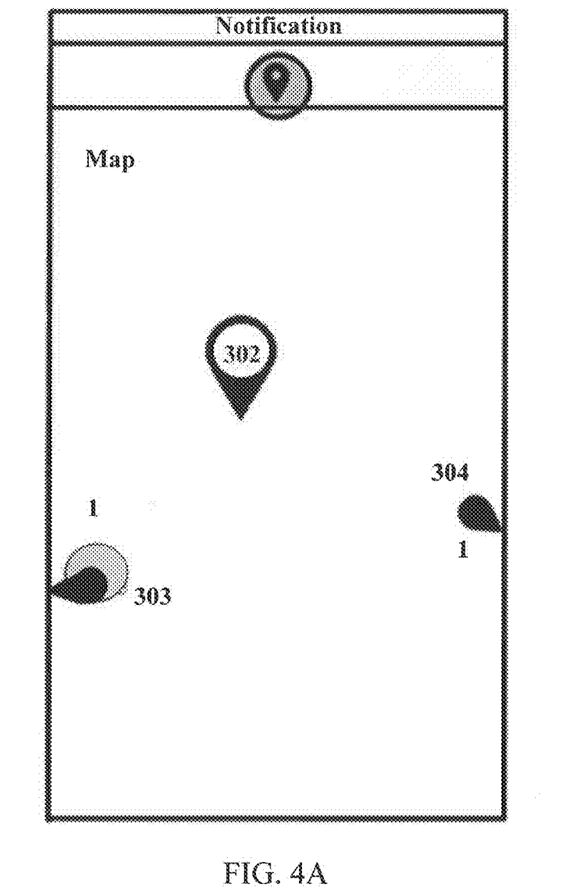
FIG. 4A is a schematic display diagram of still another instance of a positioning information processing method according to the present disclosure.
Figure 4B:
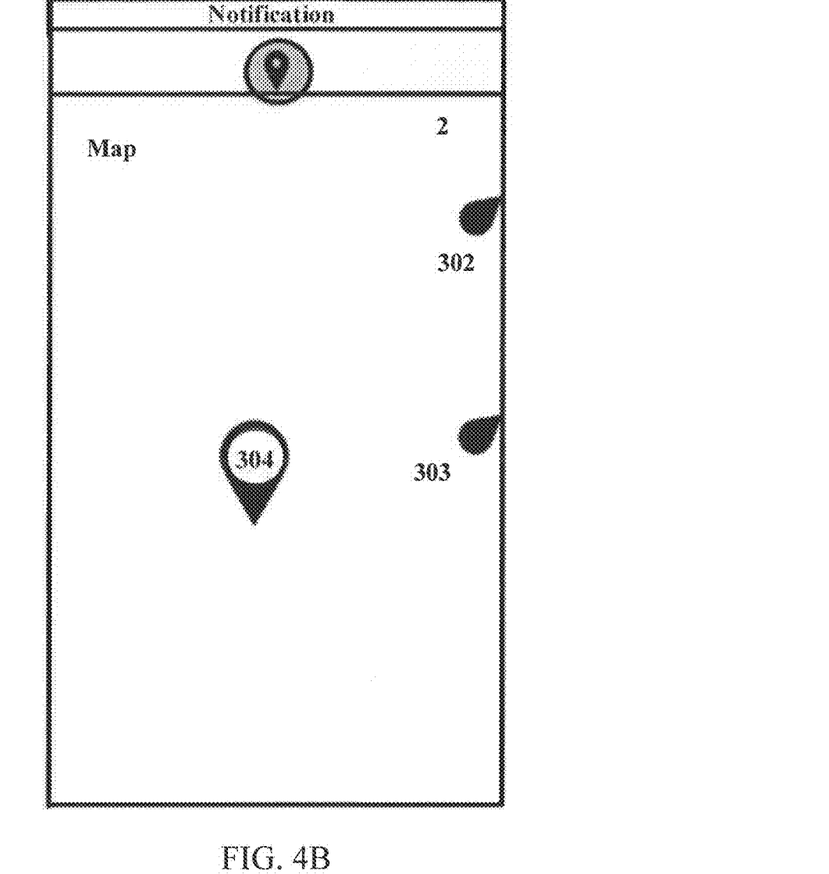
FIG. 4B is a schematic display diagram of yet another instance of a positioning information processing method according to the present disclosure.

FIG. 4A is a schematic display diagram of still another instance of a positioning information processing method according to the present disclosure. FIG. 4B is a schematic display diagram of yet another instance of the positioning information processing method according to the present disclosure. As shown in FIG. 4A and FIG. 4B, a mobile phone 301 initiates a positioning request for obtaining positioning information of a plurality of electronic devices. After receiving the request, positioning servers of three electronic devices 302, 303, and 304 obtain, using (one or more of) the GPS, the BDS, or WI-FI, a specific value of positioning information, that is, location information, and return the specific value of the positioning information to the mobile phone. A status corresponding to the (type of) value has been defined in a database of a map application on the mobile phone. If it can be learned, by means of matching, that the three electronic devices are relatively far away from each other, in a same view, specific location information of one selected electronic device, that is, the electronic device 302, is displayed, and orientations of the other two electronic devices 303 and 304 are indicated. Optionally, when there are a relatively large quantity of electronic devices whose orientations are to be indicated, in addition to directions, a quantity of electronic devices whose specific location information is not displayed is indicated. Both directions and a quantity of electronic devices whose specific location information is not displayed are indicated (FIG. 4A) or a total quantity of electronic devices whose specific location information is not displayed is indicated (FIG. 4B). This is not limited in the present disclosure.

Positioning and display manners specific to a store, a shopping mall, a parking lot, or another place are similar to those specific to an electronic device.

Figure 5:
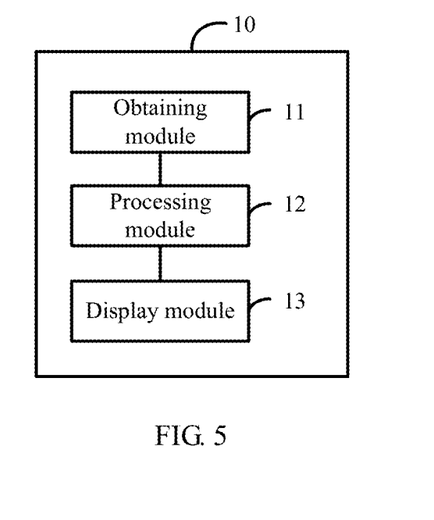
FIG. 5 is a schematic structural diagram of Embodiment 1 of a positioning information processing apparatus according to the present disclosure.

FIG. 5 is a schematic structural diagram of Embodiment 1 of a positioning information processing apparatus 10 according to the present disclosure. As shown in FIG. 5, the positioning information processing apparatus 10 includes an obtaining module 11, a processing module 12, and a display module 13.

The obtaining module 11 is configured to obtain location information of at least two to-be-positioned targets. The processing module 12 is configured to select a first to-be-positioned target from the at least two to-be-positioned targets according to the location information of all the to-be-positioned targets. The display module 13 is configured to display location information of the first to-be-positioned target, and indicate an orientation and a quantity of other to-be-positioned targets, different from the first to-be-positioned target, in the at least two to-be-positioned targets according to the location information of all the to-be-positioned targets.

The processing module 12 is further configured to obtain, according to the location information of all the to-be-positioned targets, at least one to-be-positioned target whose distance from the positioning information processing apparatus 10 is less than a preset first distance threshold, as the first to-be-positioned target.

The positioning information processing apparatus 10 provided in this embodiment is configured to implement a technical solution of a method embodiment shown in any one of FIG. 1 to FIG. 4B. The processing module 12 performs centralized analysis and processing on the location information of all the to-be-positioned targets obtained by the obtaining module 11 to determine a primary first to-be-positioned target from the to-be-positioned targets, and detailed location information of the first to-be-positioned target is displayed on a screen of the terminal device, and an orientation and a quantity of other to-be-positioned targets are indicated. A location of the first to-be-positioned target is displayed on a map that is not scaled down in order to improve accuracy of displaying the location information of the first to-be-positioned target.

Figure 6:
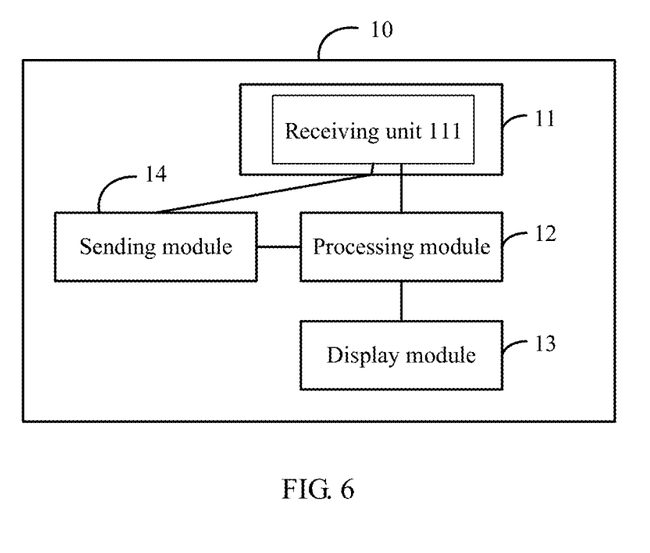
FIG. 6 is a schematic structural diagram of Embodiment 2 of a positioning information processing apparatus according to the present disclosure.

FIG. 6 is a schematic structural diagram of Embodiment 2 of a positioning information processing apparatus 10 based on FIG. 5 according to the present disclosure. As shown in FIG. 6, the positioning information processing apparatus 10 further includes a sending module 14 configured to send a positioning request to a positioning server. The positioning request includes identifier information of each to-be-positioned target and the positioning request is used to instruct the positioning server to position each to-be-positioned target and obtain positioning information.

Optionally, the obtaining module 11 is further configured to obtain a particular target identifier. The particular target identifier is used to indicate a to-be-positioned target whose location information needs to be obtained by a user.

Optionally, the processing module 12 is further configured to use, according to the location information of all the to-be-positioned targets, the to-be-positioned target corresponding to the particular target identifier and a to-be-positioned target that is in the at least two to-be-positioned targets and whose distance from the to-be-positioned target corresponding to the particular target identifier is less than a preset second distance threshold, as the first to-be-positioned target.

Optionally, the obtaining module 11 includes a receiving unit 111 configured to receive the location information of all the to-be-positioned targets that is sent by the positioning server.

Optionally, the display module 13 is further configured to display, according to the location information of all the to-be-positioned targets and in a first area on a preset-scale map displayed on a screen of the terminal device, the location information of the first to-be-positioned target and location information of other to-be-positioned targets located in the first area, and indicate, using a pointer, an orientation of other to-be-positioned targets located outside the first area and display a quantity of the other to-be-positioned targets located outside the first area. The first area is a displayable area range of the preset-scale map on the screen of the terminal device.

The positioning information processing apparatus 10 provided in this embodiment is configured to implement a technical solution of a method embodiment shown in any one of FIG. 1 to FIG. 4B. Implementation principles and technical effects thereof are similar and are not described further herein.

Figure 7:
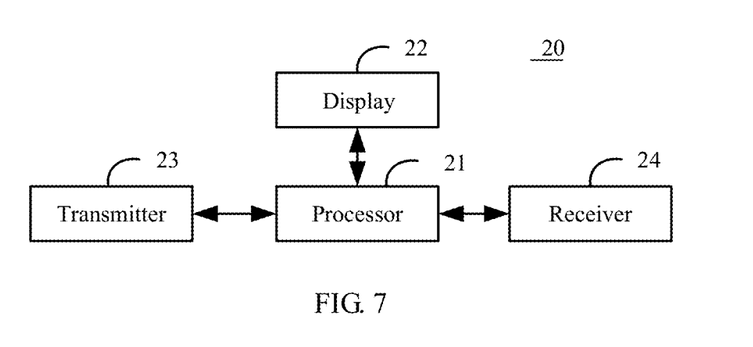
FIG. 7 is a schematic structural diagram of Embodiment 1 of a terminal device according to the present disclosure.

FIG. 7 is a schematic structural diagram of Embodiment 1 of a terminal device 20 according to the present disclosure. As shown in FIG. 7, the terminal device 20 includes a processor 21 configured to control the terminal device 20 to obtain location information of at least two to-be-positioned targets, where the processor 21 is configured to select a first to-be-positioned target from the at least two to-be-positioned targets according to the location information of all the to-be-positioned targets, and a display 22 configured to display location information of the first to-be-positioned target, and indicate an orientation and a quantity of other to-be-positioned targets, different from the first to-be-positioned target, in the at least two to-be-positioned targets according to the location information of all the to-be-positioned targets.

Optionally, the processor 21 is further configured to obtain, according to the location information of all the to-be-positioned targets, at least one to-be-positioned target whose distance from the terminal device is less than a preset first distance threshold, as the first to-be-positioned target.

Optionally, the terminal device 20 further includes a transmitter 23 configured to send a positioning request to a positioning server. The positioning request includes identifier information of each to-be-positioned target and the positioning request is used to instruct the positioning server to position each to-be-positioned target and obtain positioning information.

Optionally, the processor 21 is further configured to control the terminal device 20 to obtain a particular target identifier, where the particular target identifier is used to indicate a to-be-positioned target whose location information needs to be obtained by a user.

Optionally, the processor 21 is further configured to set, according to the location information of all the to-be-positioned targets, the to-be-positioned target corresponding to the particular target identifier and a to-be-positioned target that is in the at least two to-be-positioned targets and whose distance from the to-be-positioned target corresponding to the particular target identifier is less than a preset second distance threshold, as the first to-be-positioned target.

Further, the terminal device 20 further includes a receiver 24 configured to receive the location information of all the to-be-positioned targets that is sent by the positioning server.

Optionally, the display 22 is further configured to display, according to the location information of all the to-be-positioned targets and in a first area on a preset-scale map displayed on a screen of the terminal device 20, the location information of the first to-be-positioned target and location information of other to-be-positioned targets located in the first area, and indicate, using a pointer, an orientation of other to-be-positioned targets located outside the first area and display a quantity of the other to-be-positioned targets located outside the first area. The first area is a displayable area range of the preset-scale map on the screen of the terminal device 20.

The terminal device 20 provided in this embodiment is configured to implement a technical solution of a method embodiment shown in any one of FIG. 1 to FIG. 4B. Implementation principles and technical effects thereof are similar and are not described further herein.

Figure 8:
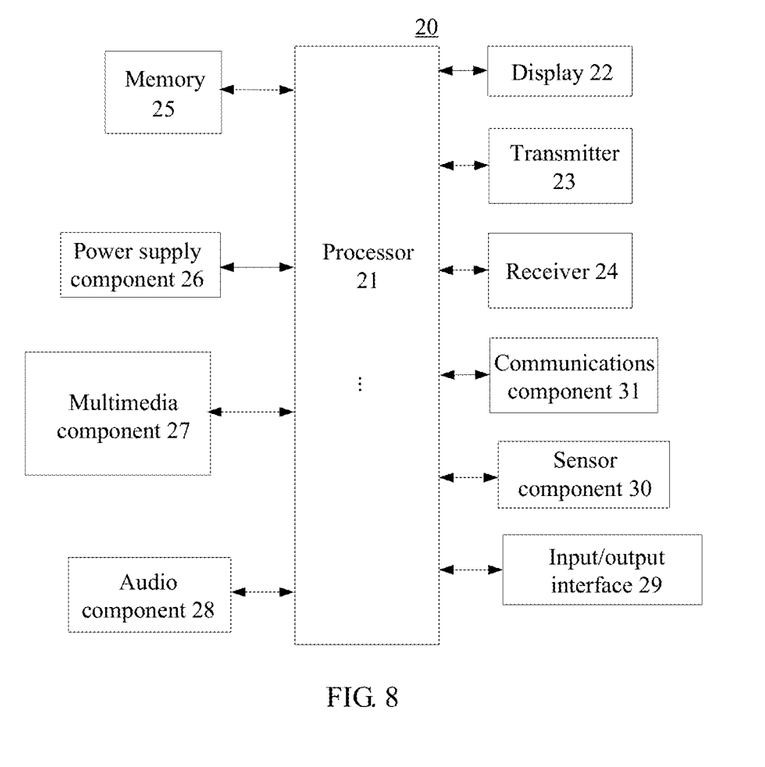
FIG. 8 is a schematic structural diagram of Embodiment 2 of a terminal device according to the present disclosure.

FIG. 8 is a schematic structural diagram of Embodiment 2 of a terminal device 20 according to the present disclosure. As shown in FIG. 8, the terminal device 20 may be a mobile phone, a computer, a digital broadcasting terminal, a message transceiver device, a game console, a tablet device, an exercise device, a personal digital assistant, or the like. In addition to the foregoing processor 21, display 22, transmitter 23, and receiver 24, the terminal device 20 further includes one or more of the following components a memory 25, a power supply component 26, a multimedia component 27, an audio component 28, an input/output interface 29, a sensor component 30, or a communications component 31. In a specific implementation, the one or more components may be selected according to an actual case.

The processor 21 is usually configured to control overall operations of the terminal device 20, for example, an operation related to display, a phone call, data communication, a camera operation, and a record operation. In this solution, no limitation is set to including only one processor. To implement functions that are more complex, one or more processor 21 may be included to execute an instruction in order to complete all or some steps of the foregoing method. In addition, the processor 21 may include a multimedia module to facilitate interaction between a multimedia component 27 and a plurality of processors 21.

The memory 25 is configured to store various types of data in order to support an operation on the terminal device 20. An example of such data includes any application program or method instruction operated on the terminal device 20, contact data, phone book data, a message, an image, a video, or the like. The memory 25 may be any type of volatile or non-volatile storage device or a combination thereof, such as a static random access memory (RAM), an electrically erasable programmable read-only memory (ROM), an erasable programmable ROM, a programmable ROM, a magnetic memory, a flash memory, a compact disk (CD), a ROM, a hard disk, a solid state disk, a magnetic tape, or a floppy disk.

The power supply component 26 supplies power to various components and modules of the terminal device 20. The power supply component 26 may include a power supply management system, one or more power supplies, and another component associated with power generation, management, and distribution of the terminal device 20. The multimedia component 27 includes a screen that provides an output interface between the terminal device 20 and a user. In some embodiments, the screen may include a liquid crystal display (LCD) or a touch panel. If the screen includes a touch panel, the screen may be implemented as a touchscreen to receive an input signal from a user. The touch panel includes one or more touch sensors to sense a touch, a swipe, or a gesture on the touch panel. The touch sensor may not only sense a boundary of the touch or swipe operation, but also detect duration and pressure related to the touch or swipe operation. In some embodiments, the multimedia component 27 includes a front-facing camera and/or a rear-facing camera. When the terminal device 20 is in an operating mode, for example, a shooting mode or a video mode, the front-facing camera and/or the rear-facing camera may receive external multimedia data. Each front-facing camera or each rear-facing camera may be a fixed optical lens system or has a focal length and an optical zoom capability.

The audio component 28 is configured to output and/or input an audio signal. For example, the audio component 28 includes a microphone. When the terminal device 20 is in an operating mode, for example, a call mode, a record mode, or a voice recognition mode, the microphone is configured to receive an external audio signal. The received audio signal may be further stored in the memory 25 or sent by the communications component 31. In some embodiments, the audio component 28 further includes a loudspeaker configured to output an audio signal.

The input/output interface 29 provides an interface between the processor 21 and a peripheral interface module (not shown). The peripheral interface module may be a keyboard, a click wheel, a button, or the like. The button may include but is not limited to a home button, a volume button, a start button, or a lock button.

The sensor component 30 includes one or more sensors and is configured to provide status evaluation of various aspects for the terminal device 20. For example, the sensor component 30 may detect an on/off state of the terminal device 20 and a relative location of a component. For example, the component may be a display and a keypad of the terminal device 20. The sensor component 30 may further detect a location change of a component of the terminal device, presence or absence of a contact between the user and the terminal device 20, an orientation or acceleration/deceleration of the terminal device 20, or a temperature change of the terminal device 20. The sensor component 30 may include a proximity sensor configured to detect presence of a nearby object when there is no physical contact. The sensor component 30 may alternatively include an optical sensor, such as a complementary metal oxide semiconductor (CMOS), or a charge-coupled device (CCD) image sensor used in an imaging application. In some embodiments, the sensor component 30 may alternatively include an acceleration sensor, a gyro sensor, a magnetic sensor, a pressure sensor, or a temperature sensor.

The communications component 31 is configured to perform wired or wireless communication between the terminal device 20 and another device. The communications component 31 may access a wireless network based on a communication standard, such as WI-FI, second generation (2G), third generation (3G), fourth generation (4G), or a combination thereof. In an example embodiment, the communications component 31 receives a broadcast signal or broadcast related information from an external broadcast management system using a broadcast channel. In a specific implementation, the communications component 31 further includes a near field communication (NFC) module to facilitate short-range communication. For example, the NFC module may be implemented based on a radio frequency identification (RFID) technology, an infrared data association (IrDA) technology, an ultra wideband (UWB) technology, a BLUETOOTH technology, and another technology.

Further, the terminal device 20 may be implemented by one or more application-specific integrated circuits (ASIC), a digital signal processor (DSP), a digital signal processing device (DSPD), a programmable logic devices (PLD), a field programmable gate arrays (FPGA), a controller, a microcontroller, a microprocessor, or another electronic component, to implement the foregoing method.

It should be understood that in the foregoing terminal device 20 embodiments, the processor 21 may be a central processing unit (CPU), or may be another general-purpose processor, a DSP, an ASIC, or the like. The general-purpose processor may be a microprocessor or the processor 21 may be any conventional processor, or the like. The steps of the method disclosed with reference to the embodiments of the present disclosure may be directly performed by a hardware processor, or may be performed using a combination of hardware in the processor and a software module.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A positioning information processing method, comprising:
    obtaining, by a terminal device, location information of at least two to-be-positioned targets;
    selecting, by the terminal device, a first to-be-positioned target from the at least two to-be-positioned targets according to the location information of the at least two to-be-positioned targets;
    displaying, by the terminal device, location information of the first to-be-positioned target; and
    indicating, by the terminal device, an orientation and a quantity of other to-be-positioned targets, different from the first to-be-positioned target, in the at least two to-be-positioned targets according to the location information of the at least two to-be-positioned targets.

2. The method of claim 1, wherein selected the first to-be-positioned target from the at least two to-be-positioned targets comprises obtaining, by the terminal device according to the location information of the at least two to-be-positioned targets, at least one to-be-positioned target whose distance from the terminal device is less than a preset first distance threshold as the first to-be-positioned target.

3. The method of claim 1, wherein before obtaining the location information of the at least two to-be-positioned targets, the method further comprises sending, by the terminal device, a positioning request comprising identifier information of each to-be-positioned target to a positioning server, the positioning request instructing the positioning server to position each to-be-positioned target and obtain positioning information.

4. The method of claim 1, wherein before selecting the first to-be-positioned target from the at least two to-be-positioned targets, the method further comprises obtaining, by the terminal device, a particular target identifier indicating a to-be-positioned target whose location information needs to be obtained by a user.

5. The method of claim 4, wherein selecting the first to-be-positioned target from the at least two to-be-positioned targets comprises setting, by the terminal device according to the location information of the at least two to-be-positioned targets, the to-be-positioned target corresponding to the particular target identifier and a to-be-positioned target in the at least two to-be-positioned targets whose distance from the to-be-positioned target corresponding to the particular target identifier is less than a preset second distance threshold as the first to-be-positioned target.

6. The method of claim 1, wherein obtaining the location information of the at least two to-be-positioned targets comprises receiving, by the terminal device, the location information of the at least two to-be-positioned targets from a positioning server.

7. The method of claim 1, wherein displaying the location information of the first to-be-positioned target, and indicating the orientation and the quantity of the other to-be-positioned targets in the at least two to-be-positioned targets comprises:
    displaying, by the terminal device according to the location information of the at least two to-be-positioned targets and in a first area on a preset-scale map displayed on a screen of the terminal device, the location information of the first to-be-positioned target and location information of other to-be-positioned targets located in the first area;
    indicating, by the terminal device using a pointer, an orientation of other to-be-positioned targets located outside the first area; and displaying, by the terminal device, a quantity of the other to-be-positioned targets located outside the first area, and the first area comprising a displayable area range of the preset-scale map on the screen of the terminal device.

8. A terminal device, comprising:
a processor configured to:
    control the terminal device to obtain location information of at least two to-be-positioned targets; and
    select a first to-be-positioned target from the at least two to-be-positioned targets according to the location information of the at least two to-be-positioned targets; and
a display coupled to the processor and configured to:
    display location information of the first to-be-positioned target; and
    indicate an orientation and a quantity of other to-be-positioned targets, different from the first to-be-positioned target, in the at least two to-be-positioned targets according to the location information of the at least two to-be-positioned targets.

9. The terminal device of claim 8, wherein the processor is further configured to obtain, according to the location information of the at least two to-be-positioned targets, at least one to-be-positioned target whose distance from the terminal device is less than a preset first distance threshold as the first to-be-positioned target.

10. The terminal device of claim 8, further comprising a transmitter coupled to the processor and the display and configured to send a positioning request comprising identifier information of each to-be-positioned target to a positioning server, and the positioning request instructing the positioning server to position each to-be-positioned target and obtain positioning information.

11. The terminal device of claim 8, wherein the processor is further configured to control the terminal device to obtain a particular target identifier indicating a to-be-positioned target whose location information needs to be obtained by a user.

12. The terminal device of claim 11, the processor is further configured to set, according to the location information of the at least two to-be-positioned targets, the to-be-positioned target corresponding to the particular target identifier and a to-be-positioned target in the at least two to-be-positioned targets whose distance from the to-be-positioned target corresponding to the particular target identifier is less than a preset second distance threshold as the first to-be-positioned target.

13. The terminal device according to claim 8, further comprising a receiver coupled to the processor and the display and configured to receive the location information of the at least two to-be-positioned targets from a positioning server.

14. The terminal device of claim 8, wherein the display is further configured to:
    display, according to the location information of the at least two to-be-positioned targets and in a first area on a preset-scale map displayed on a screen of the terminal device, the location information of the first to-be-positioned target and location information of other to-be-positioned targets located in the first area;
    indicate, using a pointer, an orientation of other to-be-positioned targets located outside the first area; and
    display a quantity of the other to-be-positioned targets located outside the first area, and
    the first area comprising a displayable area range of the preset-scale map on the screen of the terminal device.

* * * * *

UNITED STATES PATENT AND TRADEMARK OFFICE
CERTIFICATE OF CORRECTION

PATENT NO. : 10,194,273 B2
APPLICATION NO. : 15/771791
DATED : January 29, 2019
INVENTOR(S) : Qi Xie Page 1 of 1

It is certified that error appears in the above-identified patent and that said Letters Patent is hereby corrected as shown below:

On the Title Page

Item (30), "Foreign Application Priority Data" section should read:
Oct. 27, 2015 (CN) ......................................... 201510713090.3

In the Claims

Column 16, Claim 2, Line 17 should read:
The method of claim 1, wherein selecting the first to-be-positioned target from the at least two to-be-positioned targets comprises obtaining, by the terminal device according to the location information of the at least two to-be-positioned targets, at least one to-be-positioned target whose distance from the terminal device is less than a preset first distance threshold as the first to-be-positioned target.

Signed and Sealed this
Twelfth Day of March, 2019

Andrei Iancu
*Director of the United States Patent and Trademark Office*